United States Patent [19]

Farewell et al.

[11] 4,328,141

[45] May 4, 1982

[54] STABILIZATION OF ROSIN DISPERSIONS WITH LOW MOLECULAR WEIGHT NON-IONIC POLYMERS

[75] Inventors: John P. Farewell; David W. Lipp, both of Stamford, Conn.

[73] Assignee: American Cyanamid Company, Stamford, Conn.

[21] Appl. No.: 250,477

[22] Filed: Apr. 2, 1981

[51] Int. Cl.³ .................... C08L 93/00; C08L 33/62; C08F 120/56; D21H 3/38

[52] U.S. Cl. .................... 524/272; 260/97; 260/97.5; 260/99.5; 260/100; 260/101; 526/307.8; 162/168 NA; 162/180

[58] Field of Search ...................... 260/27 R

[56] References Cited

U.S. PATENT DOCUMENTS

| | | | |
|---|---|---|---|
| 2,632,699 | 3/1953 | Fowler et al. | 260/27 R |
| 2,789,921 | 4/1957 | Chaftan | 260/27 R |
| 3,193,449 | 7/1965 | Aldrich et al. | 260/27 R |
| 3,211,683 | 10/1965 | Arakawa et al. | 260/27 R |
| 3,269,969 | 8/1966 | Fikentscher et al. | 260/27 R |
| 3,419,465 | 12/1968 | Maruta | 260/27 R |
| 3,498,942 | 3/1970 | Dannals | 260/29.6 MQ |
| 3,498,943 | 3/1970 | Dannals | 260/29.6 MQ |
| 3,565,755 | 2/1971 | Davison | 260/27 R |
| 3,632,466 | 1/1972 | Peaker | 260/29.6 RW |
| 3,839,405 | 10/1974 | Dannals | 260/29.6 H |
| 3,840,489 | 10/1974 | Strazdins | 260/29.6 TA |
| 4,148,665 | 4/1979 | Kulick et al. | 106/236 |

FOREIGN PATENT DOCUMENTS 47-51574  12/1972  Japan ...................... 260/27 R

*Primary Examiner*—H. S. Cockeram
*Attorney, Agent, or Firm*—William H. Calnan

[57] ABSTRACT

Low molecular weight, non-ionic copolymers of acrylamide and a monomer selected from the group consisting of styrene, alkyl ($C_4$–$C_{24}$) substituted acrylamides and ethylene provide improved mechanical and heat stability to colloidal aqueous rosin dispersions.

20 Claims, No Drawings

180
STABILIZATION OF ROSIN DISPERSIONS WITH LOW MOLECULAR WEIGHT NON-IONIC POLYMERS

This invention relates generally to stabilized aqueous rosin dispersions and particularly to the use of low molecular weight, non-ionic copolymers of acrylamide and a hydrophobic monomer selected from the group consisting of styrene, alkyl ($C_4$–$C_{24}$) substituted acrylamides, and ethylene to provide such stability.

The acrylamide-styrene and acrylamide-alkyl ($C_4$–$C_{24}$) substituted acrylamide copolymers of this invention are random block or random copolymers. The "acrylamide-ethylene copolymer", as that term is used herein and in the appended claims is a block copolymer which may be prepared by reacting an n-alkyl mercaptan, or n-alkyl phosphine, wherein the alkyl group contains from 12 to 18 carbon atoms, with acrylamide. The result of such reaction is that ethylene is the pro forma "monomer" in the reaction product and the sulfur or phosphorus atom acts as the link between the two blocks in the copolymer.

The stabilized aqueous rosin dispersions are, in turn, useful in the manufacture of paper products having improved resistance to water penetration and aqueous ink compositions.

It is well known that natural rosin is emulsifiable in hot dilute aqueous alkali solution and that the resultant colloidal dispersion is an excellent paper-sizing agent. The best known agent of this type is the "Bewoid" size described in Pulp and Paper by James P. Casey, 2nd Ed., (Vol. 11, p. 1049 ff.). However, when this dispersion is subject to intense shear forces, as occurs when passed through a centrifugal or gear pump which are commonly used in commercial manufacturing plants and paper mills, the dispersed phase aggregates and forms agglomerates. The result is a fouling and jamming of the pumps by the sticky broken rosin emulsion. In addition, coagulated rosin particles may find their way into the paper machine and cause picking, breaks, rosin spots, wire filling or other problems.

Another disadvantage of such a rosin dispersion is thermal instability, i.e., aggregation when subjected to heat. Indeed, some agglomerates may be formed at room temperature when no stabilizing agent is present.

Rosin dispersions which have agglomerated, for whatever reason, are of no commercial value.

U.S. Pat. No. 4,148,665 discloses the use of tetrasodium N-(1,2-dicarboxyethyl)-N-octadecyl sulfosuccinamate, disodium N-octadecylsulfosuccinamate, disodium dodecylpenta(ethoxy)ethylsulfosuccinate and disodium decylsulfosuccinate, all ionic compounds, as stabilizing agents for rosin dispersions. It has been found, however, that the mechanical stability of dispersions stabilized by the foregoing compounds is impaired when the dispersions are stored for long periods of time, i.e., six months or more. In addition, the dispersions quickly lose their mechanical stability if exposed to heat.

U.S. Pat. No. 3,840,489 discloses that non-ionic, relatively high molecular weight styrene-acrylamide copolymers dispersed in an aqueous medium, will act as a dry strength agent for paper.

U.S. Pat. Nos. 3,498,942, 3,498,943, 3,632,466 and 3,839,405 all disclose the use of alkyl sulfide terminated oligomers, containing two appendant polar (readily ionized) groups, as emulsifiers. However, no use of these oligomers in aqueous rosin dispersion stabilization is suggested.

It has now been discovered that the addition of a non-ionic copolymer of acrylamide and a hydrophobic monomer selected from the group consisting of styrene, alkyl ($C_4$–$C_{24}$) substituted acrylamides and ethylene, having a substantially lower molecular weight than the polymers set forth in U.S. Pat. No. 3,840,489, i.e., such that the viscosity is between about 30 and 100 centipoises as opposed to at least 250 centipoises for a ten percent by weight solution, to an aqueous rosin dispersion significantly improves the mechanical and heat stability of such dispersion. As a result, the commercial value of the rosin dispersion is greatly enhanced.

Although the copolymers of the present invention do contain both hydrophilic (acrylamide) and hydrophobic (styrene, an alkyl ($C_4$–$C_{24}$) substituted acrylamide or ethylene) components, they are neither intentionally or extensively ionized in water. Specifically in contradistinction to the alkyl sulfide terminated oligomers of U.S. Pat. Nos. 3,498,942, 3,489,943, 3,632,466 and 3,839,405, the acrylamide-ethylene copolymers (as well as the other copolymers) of the present invention contain essentially no (i.e., less than 1%) carboxyl groups. They are, therefore, considered to be non-ionic.

The relative amounts, by weight, of the monomers in the copolymers is an important parameter and may vary as follows:

The acrylamide-styrene copolymer, a random block or random copolymer, is comprised of about 75 to 95% acrylamide, preferably 85%, and about 25 to 5% styrene, preferably 15%.

The acrylamide-alkyl ($C_4$–$C_{24}$) substituted acrylamide copolymer, also a random-block or random copolymer, is comprised of about 40 to 80% acrylamide, preferably 60%, and about 60 to 20% alkyl ($C_4$–$C_{24}$) substituted acrylamide, preferably 40%.

In the acrylamide-ethylene copolymer, a block copolymer with either a sulfur or phosphorus atom joining the blocks, acrylamide comprises about 50 to 75% thereof. Preferably, acrylamide comprises about 70% of the copolymer.

As stated above, the viscosities (and molecular weights) of the copolymers of the instant invention are quite low. The viscosity for a 10% solution of the polymer should be between about 30 and 100 centipoises, preferably between about 40 and 80 centipoises.

It is to be noted that in the copolymers of the instant invention, the hydrophilic component (acrylamide) is present in an amount such that the copolymer is finely dispersed in water so as to form a cloudy solution and the hydrophobic component (styrene, alkyl ($C_4$–$C_{24}$) substituted acrylamide or ethylene) is present in an amount such that it will associate with the dispersed rosin to a degree sufficient to stabilize same. Alternatively the copolymer may be an alkyl ($C_4$–$C_{24}$) substituted methacrylate- or acrylate-acrylamide copolymer.

The rosin in the dispersion of the present invention may be any of the natural or fortified paper-making rosins. Thus the rosin may be ordinary gum or wood rosin, or ordinary tall oil rosin, or tall oil rosin which has been heat-isomerized or disproportionated or reacted with formaldehyde to render it noncrystallizing. Such rosins generally have flow points below about 90° C.

The rosins may also be any of the foregoing rosins which have been "fortified" by reaction with compounds which increase their molecular weight and which introduce carboxy groups into the molecule. Such rosins are generally prepared by reacting the foregoing or similar rosins with at least about 0.05 mol of a compound such as maleic anhydride, fumaric acid, itaconic acid, citraconic acid, acetylene dicarboxylic acid, etc. About 0.25 mol of the compound is usually the optimum, but up to 1 mol of the compound may be reacted, in which event the product is conventionally diluted with unreacted rosin to decrease the content of the —CO—C=C— containing rosin to the 0.25 mol level.

In the dispersion, the rosin is in the colloidal state, i.e., it is so finely divided that the dispersion substantially does not cream when allowed to stand.

Typically, the rosin is dispersed in water with the use of an anionic surfactant. In accordance with the present invention, the copolymer is simply added to such a dispersion generally at room temperature in an amount sufficient to stabilize that particular dispersion. The amount will vary, therefore, depending upon the length of time and conditions of storage of the dispersion itself. The optimum amount of copolymer to be used in a given instance is therefore most conveniently determined by routine experimentation. Generally, however, the copolymer is present in an amount equal to from about 0.5 to 2.0%, based on the rosin weight, with from about 0.8 to 1.4% preferred and from about 1.0 to 1.2% most preferred. Typically, the copolymer is added as a 5 to 10% solution. In addition to the present rosin stabilizer, other conventional stabilizers may also be included.

The following examples are illustrative of the present invention, but the invention is not deemed in any way limited thereby. All parts and percentages are by weight unless otherwise indicated.

EXAMPLE 1

The following illustrates preparation of a styreneacrylamide copolymer suitable for purposes of the present invention.

A solution of 150 g. of acrylamide in 1500 g. of deionized water is sparged with $N_2$ for 30 minutes. There is then added 15 g. of 2-propanol. The $N_2$ sparging is continued for 10 more minutes, whereupon the $n_2$ sparge tube is raised above the liquid surface so as to maintain an $N_2$ blanket thereover. The suspension is then stirred as 27.6 g. of styrene and 0.25 g. of 2-mercapto-ethanol are added. The reaction mixture temperature is quickly raised to 60° C. and 1.5 g. of ammonium persulfate in 15 g. of $N_2$ sparged deionized water is added. The temperature is then raised to 75° C. and maintained there for four hours, whereupon the reaction is cooled to room temperature and the copolymer product is recovered. The viscosity of a 10% solution is 50 centipoises.

EXAMPLE 2

This example demonstrates a method for preparing an acrylamide-alkyl ($C_4$–$C_{24}$) substituted acrylamide copolymer of this invention.

325 ml. if isopropyl alcohol, 175 ml. of deionized water, 80 g. of acrylamide and 20 g. of t-butylacrylamide are heated to 65° C. Thereupon, 0.7 g. of sodium persulfate dissolved in 20 ml. of deionized water and 1.5 g. of ammonium persulfate dissolved in 10 ml. of deionized water are added.

Reaction temperature is maintained at 85° C. by refluxing and the pH is kept between 3.5 and 6 by addition of ten percent sodium hydroxide solution as needed.

After 1 hour, 80 g. of acrylamide and 20 g. of t-butylacrylamide are added, and the reaction temperature is maintained between 75° and 85° C. for one more hour.

Vacuum distilling off most of the isopropyl alcohol and some water yields a 44 percent solids solution which is a nearly transparent yellow and contains the copolymer having a molecular weight between 3,000 and 4,000. The viscosity of a ten percent solution is 32 to 43 centipoises.

EXAMPLE 3

The following illustrates the preparation of a sulfur joined acrylamide-ethylene copolymer of the present invention.

A mixture of 150 g. of acrylamide and 1500 g. of dry 1,4-dioxane is sparged with $N_2$ for 30 minutes. The $N_2$ sparge tube is then raised above the liquid surface so as to maintain an $N_2$ blanket thereover. 60 g. of $N_2$ sparged dodecylmercaptan is added to the mixture, and it is stirred while the reaction temperature is raised to 50° C. 3 g. of 2,2'-azobis-(2,4-dimethylvaleronitrile) dissolved in 50 g. of $N_2$-sparged 1,4-dioxane is added as a catalyst and the temperature of the reaction rises to 70° C. The mixture is maintained at 70° C., with vigorous agitation, for 4 hours. Then, as agitation is maintained, the reaction is cooled to room temperature.

The product is collected on a fritted filter funnel, washed with 2 liters of ethyl acetate and dried. The viscosity of a 10% solution is 50 centipoises.

EXAMPLE 4

This example illustrates an alternative method for preparing a sulfur joined acrylamide-ethylene copolymer of the present invention.

To 150 g. of acrylamide and 1500 g. of dry ethyl acetate is added 60 g. of octadecylmercaptan. The mixture is sparged with $N_2$ for 30 minutes while being heated to 40° C. The $N_2$ sparge tube is raised above the liquid surface so as to maintain an $N_2$ blanket thereover.

3 g. of 2, 2'-azobis-(2,4-dimethyl-4-methoxyvaleronitrile) dissolved in 50 g. of $N_2$-sparged ethyl acetate is added. The reaction temperature rises slowly to 50° C. where it is held for 3 hours while vigorous agitation is maintained. Thereupon, the agitation is continued as the reaction is cooled to room temperature.

The reaction product is collected in a fritted filter funnel and washed with 2 liters of pentane. It is first air dried and then dried overnight in a vacuum oven. The viscosity of a 10% solution is 42 centipoises.

EXAMPLE 5

The following illustrates the preparation of a phosphorus joined acrylamide-ethylene copolymer of the present invention.

The procedure of Example 4 is repeated except that the octadecylmercaptan is replaced by an equivalent amount of hexadecylphosphine.

EXAMPLE 6

The following illustrates the comparative mechanical stabilities of paper-sizing rosin dispersions which contain a nonionic copolymer stabilizing agent of this invention and the tetrasodium N-(1,2-dicarboxyethyl)-N- octadecylsulfosuccinamate, (Aerosol 22), from U.S. Pat. No. 4,148,665.

A rosin dispersion was prepared by dissolving 840 g. of fortified tall oil rosin in 560 g. of toluene and adding 2100 g. of deionized water and 34 g. of a 25% solution of sodium alkyl benzene sulfonate. The mixture is stirred, then homogenized at room temperature. After stripping off the toluene, the resulting dispersion has an average particle size of about 0.5 microns.

Samples of the dispersion are then treated with stabilizing agents as shown in Table I below. All dispersions are adjusted to 35.1% total solids content by the addition of water. Addition and dilution are done under moderate agitation. The samples are artificially aged by heating in an oven at 60°±2° C. for 16 hours.

The comparative mechanical stability of each emulsion is then obtained by placing 200 g. of an emulsion in a Waring blender at about room temperature and noting the time which elapses before the emulsion breaks, i.e., agglomerates.

A control run is performed without addition of any stabilizing agent. Results are as follows:

TABLE I

| Stabilizer Designation | Amount and type of Stabilizing Agent Added | Minutes to Break Dispersion |
|---|---|---|
| — | CONTROL | 2.5 |
| A | 1.5% of a 35% aqueous solution of tetrasodium N-(1,2-dicarboxyethyl)-N-octadecylsulfosuccinamate | 4.5 |
| B | 0.4% of STY/AMD copolymer[a] | 16.0 |
| C | 0.8% of STY/AMD copolymer[a] | 17.0 |
| D | 1.2% of STY/AMD copolymer[a] | 18.4 |
| E | 1.6% of STY/AMD copolymer[a] | 22.5 |
| F | 1.0% of ETHYLENE/AMD copolymer[b] | 12.0 |

Note:
[a]Copolymer is 15% styrene - 85% acrylamide having a final solids content of 10% and a viscosity of 40 centipoises (cps)
[b]Copolymer, prepared by reacting n-dodecylmercaptan with acrylamide, having 68% acrylamide and a final solids content of 10% and a viscosity of 50 centipoises.

EXAMPLE 7

This example demonstrates the time durability of the stabilizer of the present invention.

Stabilizers A and C from Example 6 were added to rosin dispersions which were then allowed to stand at room temperature. A Waring blender test at the times set out in Table II demonstrate the improved stability of the rosin dispersion when the non-ionic copolymer of this invention is used.

TABLE II

| | Minutes to Break Dispersion | |
|---|---|---|
| Stabilizer | 5 Days Aging | 7 Months Aging |
| A (prior art) | 21 | 7 |
| C | 23 | 20 |

EXAMPLE 8

This example shows the importance of the viscosity and amount of stabilizer added to the aqueous rosin dispersion Waring blender tests (where the end point was the appearance of visible brown rosin particles, or a rapid change in blender speed indicating a catastrophic change in the dispersion) of a range of non-aged, stabilized dispersions yielded the results set forth in Table III. The control dispersion, containing no stabilizer, broke immediately.

TABLE III

| Stabilizer | Minutes to Break |
|---|---|
| CONTROL | 0 |
| A (prior art) | 20 |
| C | 19.5 |
| 0.8% 700 cps. X | Too viscous to test |
| 0.8% 300 cps. X | 2 |
| 0.15% 40 cps. X | 3 |
| 0.6% A and 0.6% 40 cps. X | 20 | where X=a 15% styrene/85% acrylamide copolymer. The results demonstrate that when the copolymer is too viscous (300 cps), the dispersion breaks quickly. It is also noted that when only 0.15% of a copolymer within the invention's viscosity range was used, it did not effectively stabilize the dispersion.

EXAMPLE 9

In this example, the end point in the Waring blender test was the appearance of agglomerates visible in a smear on a glass slide or sensible to the touch as grains. The results are tabulated in Table IV.

TABLE IV

| | Minutes to break Dispersion | |
|---|---|---|
| Stabilizer | Without Aging | Aging as in Example 5 |
| A (prior art) | 20 | 8.5 |
| C | 19.5 | 16 |
| 0.8% of 40% t-butylacrylamide/60% acrylamide copolymer, cps | 18.5 | 16.5 |
| 0.8% of 40% t-butoxyacrylamide/60% acrylamide copolymer, cps. | 7.5 | 5.5 |
| 0.75% of 50% t-butylacrylamide/50% acrylamide copolymer, cps. | — | 22 |

The results reinforce the claim that the copolymers of the present invention are superior stabilizers. It is noted that the t-butoxyacrylamide/acrylamide copolymer, which is not within the group of copolymers herein disclosed and claimed, was found to be a relatively poor aqueous rosin dispersion stabilizer.

EXAMPLE 10

Rosin dispersions containing stabilizer A (prior art) and stabilizer F (ethylene/acrylamide) were stored on a shelf in the laboratory for 77 days. The percent of solids measured in the dispersions, before being tested in a Waring blender where the temperature was maintained at 40° C.·2° C. by use of an immersed cooling coil through which water was pumped, were 34.5% and 34.7% respectively. The rosin dispersion stabilized by A broke in 15 minutes in the Waring Blender, forming a paste. After 45 minutes in the blender, the F-stabilized dispersion still had a solids content of 34.0%.

What is claimed is:

1. A rosin dispersion consisting essentially of a paper sizing rosin as dispersed phase in an aqueous medium as continuous phase, said medium having incorporated therein a stabilizingly effective amount of a non-ionic copolymer of acrylamide and a hydrophobic monomer selected from the group consisting of styrene, alkyl ($C_4$-$C_{24}$) substituted acrylamides and ethylene, wherein the molecular weight of the copolymer is such that the viscosity for a 10% solution thereof is about 30 to 100 centipoises.

2. The dispersion of claim 1 wherein the viscosity is about 40 to 80 centipoises.

3. The dispersion of claim 1 wherein the copolymer contains about 75% to 95%, by weight, acrylamide and about 25% to 5% styrene.

4. The dispersion of claim 3 wherein the copolymer contains about 85%, by weight, acrylamide and about 15% styrene.

5. The dispersion of claim 1 wherein the copolymer contains about 40% to 80%, by weight, acrylamide and about 60% to 20% of an alkyl ($C_4$–$C_{24}$) substituted acrylamide.

6. The dispersion of claim 5 wherein the copolymer contains about 60%, by weight, acrylamide and about 40% of an alkyl ($C_4$–$C_{24}$) substituted acrylamide.

7. The dispersion of claim 5 or claim 6 wherein the alkyl substituted acrylamide is t-butylacrylamide.

8. The dispersion of claim 1 wherein the copolymer is of acrylamide and ethylene and contains about 50 to 75%, by weight, acrylamide.

9. The dispersion of claim 8 wherein the copolymer contains about 70%, by weight, acrylamide.

10. The dispersion of claim 8 or claim 9 wherein the copolymer is prepared by reacting an n-alkyl mercaptan or an n-alkyl phosphine, wherein the alkyl group contains from about 12 to 18 carbon atoms, with acrylamide.

11. The dispersion of claim 10 wherein the n-alkyl mercaptan is N-dodecylthiol.

12. The dispersion of claim 1 wherein the copolymer is present in an amount equal to from about 0.5% to 2.0%, based on the rosin.

13. The dispersion of claim 1 wherein the copolymer is present in an amount equal to from about 0.8% to 1.4%, based on the rosin.

14. The dispersion of claim 1 wherein the copolymer is present in an amount equal to from about 1.0% to 1.2%, based on the rosin.

15. A method of stabilizing an aqueous dispersion of paper sizing rosin comprising incorporating therein an effective stabilizing amount of a non-ionic copolymer of acrylamide and a hydrophobic monomer selected from the group consisting of styrene, alkyl ($C_4$–$C_{24}$) substituted acrylamide and ethylene, wherein the molecular weight of the copolymer is such that the viscosity for a 10% solution thereof is about 30 to 100 centipoises.

16. The method of claim 15 wherein the copolymer contains about 75% to 95%, by weight, acrylamide and 25% to 5% styrene.

17. The method of claim 15 wherein the copolymer contains about 40% to 80%, by weight, acrylamide and about 60% to 20% of an alkyl ($C_4$–$C_{24}$) substituted acrylamide.

18. The method of claim 15 wherein the copolymer is of acrylamide and ethylene and contains about 50 to 75%, by weight, acrylamide.

19. The method of claim 18 wherein the copolymer is prepared by reacting an n-alkyl mercaptan or an n-alkyl phosphine, wherein the alkyl group contains from about 12 to 18 carbon atoms, with acrylamide.

20. The method of claim 15 wherein the copolymer is present in an amount equal to from about 0.5% to 2.0%, based on the rosin.

* * * * *